April 1, 1941.    R. F. METZGER    2,236,713
APPARATUS FOR GRINDING LENSES
Filed Aug. 4, 1938
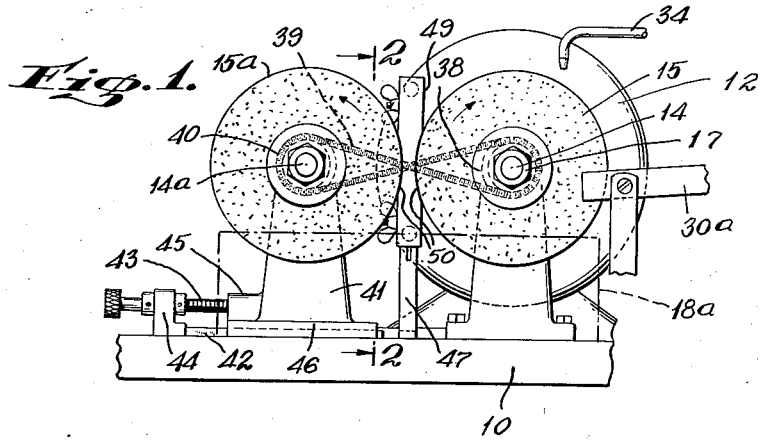
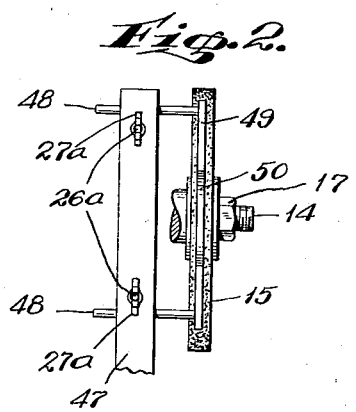
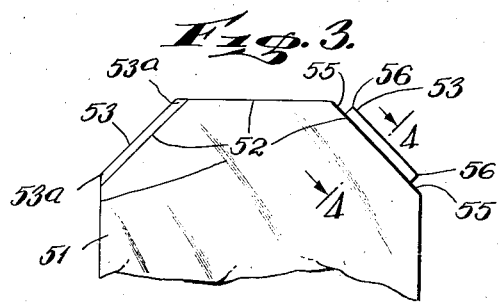
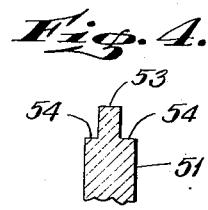
INVENTOR
REINHARDT FREDERICK METZGER
BY
*Howard C. Thompson*
ATTORNEY Patented Apr. 1, 1941

2,236,713

UNITED STATES PATENT OFFICE 2,236,713

APPARATUS FOR GRINDING LENSES

Reinhardt Frederick Metzger, Glendale, N. Y.

Application August 4, 1938, Serial No. 223,025

3 Claims. (Cl. 51—80)

This invention relates to apparatus for grinding lenses and particularly in the production of lenses of the type and kind disclosed in my prior application Serial Number 204,733 filed April 28, 1938, and the object of the invention is to provide an apparatus comprising one or more grinding wheels or disks with means adjustable transversely of the surface of the disk or disks for gaging the radial depth of the grinding operation to be performed on the peripheral edge or edges of the lens; a further object being to provide means for moistening the grinding wheel or disk and for wiping the same clean in advance of engaging the workpiece; a still further object being to provide a workpiece supporting table adjacent the grinding wheel or disk and in spaced relation to the first named adjustable means for supporting the lens in forming a notch or indenture in the peripheral edge of a lens at one or more points circumferentially thereof; a further object being to provide a dual wheel grinder with means for adjusting one of the wheels with respect to the other to regulate the grinding operation to be performed on opposed surfaces of a lens at the peripheral edge thereof in forming coupling flanges as more fully hereinafter described and claimed; and with these and other objects in view the invention consists in an apparatus for forming lenses as more fully hereinafter described and claimed.

The invention is fully disclosed in the following specification, of which the accompanying drawing forms a part, in which the separate parts of my improvement are designated by suitable reference characters in each of the views, and in which:

Fig. 1 is an end view of an apparatus embodying my invention.

Fig. 2 is a partial section substantially on the line 2—2 of Fig. 1.

Fig. 3 is a detail view of a lens indicating two steps in forming the coupling flanges on the peripheral edges thereof, and:

Fig. 4 is a partial section on the line 4—4 of Fig. 3.

My invention deals with the formation of reduced flanges on other peripheral edge portions of lenses and particularly in eye-glass lenses to adapt the same for use in various kinds and classes of mountings, such for example as the type of mounting specifically described and claimed in my prior application Serial Number 204,733 hereinbefore identified, and for this reason only one form or type of lens construction is shown, it being understood that the apparatus herein disclosed is adaptable for use in shaping the peripheral edges of lenses of any kind or class especially in reducing the thickness of the lenses at the peripheral edges thereof by grinding one or both side surfaces of the lenses and further in reducing the radial dimension of the lenses at the peripheral edges thereof, especially in forming projecting, coupling or mounting flanges or elements.

In Figs. 1 and 2 of the drawing I have shown more or less diagrammatically one form of apparatus comprising a suitable base plate 10 on which is supported an electric motor 12. At 14, is shown a motor shaft on which is arranged a grinding wheel or disk 15 secured in position by a nut 17. In spaced co-planar relation to the wheel 15 is a supplemental wheel 15a rotatably supported on a shaft 14a. The motor shaft 14 includes a pulley 38 and around this pulley is passed a flexible belt 39, such for example as a rubber or spring belt, which is crossed and passed around another pulley 40 on the supplemental shaft 14a. The shaft 14a is in turn supported on a standard 42 adjustable back and forth on a suitable guide 42 toward and from the wheel 15 by a screw 43 arranged in a suitable bearing 44 on the guide 42. The screw is in threaded engagement with the standard as at 45, as will be apparent. The bottom plate of the standard is keyed to the guide plate 42 so that the alinement of the wheels 15—15a is maintained.

With this construction, a rod 47 extends upwardly from the base of the machine intermediate of the two wheels 15—15a and rearwardly thereof, the end of this rod or standard is split to receive two bolts 26a, similar to the bolt 26, and wing nuts 27a to clamp two rods 48 therebetween, the rods supporting at their free ends a gage plate 49 adapted to fit between adjacent surfaces of the wheels 15—15a and being recessed at opposite sides as seen at 50 to conform with the contour of the periphery of said wheels. With this construction, it will be apparent that the plate 49 can be adjusted back and forth over the surfaces of the wheels 15—15a to gage the radial depth of the grinding operation to be performed on opposed surfaces of the lens simultaneously in one passage of the workpiece between the two rotating grinding wheels. It will be understood that different gage plates may be used for different operations to be performed on the workpiece consistent with the adjustment of the wheels, one with respect to the other, it being understood that the workpiece is gradually passed down between the wheels in grinding the opposed surfaces thereof.

In dot and dash lines I have indicated at 18a, in Fig. 1 of the drawing, a tank supplying water to both of the wheels. At 30a is shown part of a table which is associated with the wheel 15, and adapted for the support of a lens in certain grinding operations as hereinafter described, To illustrate one method of carrying the invention into effect, I have shown, in Figs. 3 and 4 of the drawing, parts of an eye-glass lens 51, in Fig. 3 of the drawing I have indicated the result of two different operations performed on a lens having a series of angularly arranged peripheral walls 52. At this time, it will be understood that my invention is not limited to any particular shape of lens, the specific showing in the drawing is only for illustrative purposes.

At the left of Fig. 3 one of the peripheral edge portions of the lens is ground on two surfaces to form a reduced flange portion 53, which is of less thickness than the remainder of the adjacent portion of the lens, a groove being formed on opposed side surfaces of the lens as seen at 54 in Fig. 4 of the drawing. In this connection, it will be understood that only one of the grooves 54 need be employed, and this may be arranged on either surface of the lens in accordance with the teaching in said earlier application.

To adapt the lens for the use as taught in said earlier application, the end portions 53a of the flange 53, as seen at the left of Fig. 3 of the drawing, must be cut away or notched as seen at 55 at the right of Fig. 3 of the drawing so that the resulting flange 53 is of less length than the adjacent portion of the lens so as to form shoulders 56 at the ends of the flange 53. The nicking or notching operation is performed by laying the lens upon the table 30a and moving the portions 53a to be removed over the corners of the grinding wheel 15 as will be apparent.

Where undercut shoulders are required rather than the perpendicular or rectangular corners, special forms of grinding wheels will be employed.

It will of course be understood that the adjustment of the gage plate 49 will govern the radial depth of the cut to be performed in the lens to regulate the height of the protruding flange 53. In grinding a lens the edge of the lens is supported against the plate 49 and passed downwardly between the wheels 15—15a, and the adjustment of the two wheels, one with respect to the other, will control the thickness of the resulting flange.

It will be understood that in applying my improved method to eye-glasses of prescription specification, the frames or other accessories applied to the lens must be made to suit lens of different kinds and classes and, therefore, the skill of a mechanic in performing the different grinding operations must be depended upon to suit the hardware or frame construction which has been selected, the latter being standardized to certain degree. However, in the mass production of lenses, such for example as sun-glasses and the like, it will be understood that the various operations performed on the lenses may be standardized and in such cases suitable gages will be provided for regulating the different operations to be performed, that is to say, in addition to the gage as at 49 and the adjustments as at 43.

My invention relates, as will be apparent, to the grinding of lenses of various kinds and classes to adapt the same for what might be termed "Special" mounting or detachable mounting in suitable supports or frame parts, and in referring to lenses, I of course mean a transparent body of any type or kind which need not necessarily be glass, and which may be used for any purpose, such for example as in the production of watch crystals.

My present invention may be adapted for the construction of "Special" crystals for firm or positive mounting in watch-cases or irregular or special designs to prevent displacement of the crystal therefrom.

Having fully described my invention, what I claim as new and desire to secure by Letters Patent, is:

1. A grinding apparatus for grinding peripheral edges of a lens or similar workpiece comprising a direct driven grinding wheel, a supplemental grinding wheel, said wheels being arranged with peripheral surfaces in common alinement and spaced relationship, means for adjusting one of the wheels toward and from the other to regulate the spacing between the adjacent surfaces thereof, a gage arranged between said surfaces and adjustable transversely across the surfaces to regulate the exposure of a workpiece to the peripheral surfaces of said wheel from one side thereof, means involving a flexible drive for driving the supplemental wheel in a direction reverse to that of the first named wheel, and a radially arranged workpiece supporting table partially enveloping one of said wheels, said table being adapted to support the workpiece in performing other grinding operations thereon.

2. A grinding apparatus of the class described comprising a pair of grinding wheels arranged in a common plane with peripheral surfaces in opposed parallel relation, and with at least one side surface of each wheel in alinement, means for positively driving one of said wheels, means involving a yielding coupling for driving the other of said wheels in a direction opposite to the relation of the positively driven wheel, means for adjusting one of said wheels toward and from the other to regulate the spacing between adjacent peripheral surfaces thereof, and a gage adjustable across the peripheral surfaces of both of said wheels to regulate the exposure of the peripheral surfaces of the wheels to a workpiece passed therebetween.

3. A grinding apparatus for grinding peripheral edges of a lens or similar workpiece, said apparatus comprising a direct driven grinding wheel and a supplemental grinding wheel, said wheels being arranged in a common radial alinement with opposed peripheral surface thereof in spaced relation and movable in the same direction, means for adjusting one of the wheels toward and from the other to regulate the spacing between the adjacent surface thereof, a gage arranged between said surfaces and adjustable transversely thereof to regulate the exposure of a workpiece to the peripheral surfaces of said wheels, and said gage conforming substantially to the adjacent peripheral contour of said spaced wheels.

REINHARDT FREDERICK METZGER.